(12) United States Patent
Kitayama et al.

(10) Patent No.: US 8,352,861 B2
(45) Date of Patent: *Jan. 8, 2013

(54) DISPLAY CONTROL INFORMATION GENERATION

(75) Inventors: Fumihiko Kitayama, Sagamihara (JP); Shin-ichi Hirose, Tokyo-to (JP); Hiroaki Nakamura, Yokohama (JP); Go Kondo, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/140,116

(22) Filed: Jun. 16, 2008

(65) Prior Publication Data

US 2008/0307300 A1  Dec. 11, 2008

Related U.S. Application Data

(63) Continuation of application No. 11/081,072, filed on Mar. 15, 2005.

(30) Foreign Application Priority Data

Mar. 15, 2004 (JP) ................................. 2004-072990

(51) Int. Cl.
*G06F 17/00* (2006.01)

(52) U.S. Cl. ........ 715/277; 715/221; 715/222; 715/223; 715/224; 715/225; 715/226; 715/234; 715/780

(58) Field of Classification Search .......... 715/221–226, 715/234, 780, 277
See application file for complete search history.

(56) References Cited

U.S. PATENT DOCUMENTS

| | | | | |
|---|---|---|---|---|
| 6,167,523 | A * | 12/2000 | Strong | 726/21 |
| 6,535,883 | B1 * | 3/2003 | Lee et al. | 707/694 |
| 2002/0099739 | A1 * | 7/2002 | Fischer | 707/515 |
| 2002/0143651 | A1 * | 10/2002 | Kishi | 705/26 |
| 2002/0178175 | A1 * | 11/2002 | Li | 707/200 |
| 2002/0194219 | A1 * | 12/2002 | Bradley et al. | 707/506 |
| 2004/0049574 | A1 * | 3/2004 | Watson et al. | 709/224 |
| 2004/0226002 | A1 * | 11/2004 | Larcheveque et al. | 717/126 |
| 2004/0268229 | A1 * | 12/2004 | Paoli et al. | 715/508 |
| 2005/0108625 | A1 * | 5/2005 | Bhogal et al. | 715/505 |

* cited by examiner

*Primary Examiner* — Cesar Paula
*Assistant Examiner* — David Faber
(74) *Attorney, Agent, or Firm* — Michael J. Buchenhorner; Vazken Alexanian

(57) ABSTRACT

Provides a Web server for generating display control information for dividing and displaying a form in a style conforming to a client device used by a user, which includes a HTTP request reception unit for receiving a form request from the client device, an application code database for storing a screen definition of the form subjected to the form request and a code of a validator for executing validation of an input value inputted into an input item in the form, a form division unit for dividing the form in conformity to the acquired terminal capacity by use of the read-out screen definition of the form and the read-out code of the validator, and a screen generation unit for generating screen information to be displayed on the client device by use of a result of division.

4 Claims, 13 Drawing Sheets

FIG. 8

```
1: <%@ page language="java" %>
2: <%@ taglib uri="/WEB-INF/struts-bean.tld" %>
3: <jsp:useBean class="divform.ValidatorStatus" id="vstatus" scope="session"/>
4: <jsp:useBean class="divform.SubmitMaker" id="sbutton" scope="session"/>
5: <html><head/><body>
6:   <a href="divPage1.jsp"><bean:write name="vstatus" property="status1"/></a> |
7:   <em><bean:write name="vstatus" property="status1"/></em> |
8:   <a href="divPage3.jsp"><bean:write name="vstatus" property="status3"/></a> |
9:   <form action="doForm.do">
10:     <input type="text" name="username" value="<%= vstatus.value('username') %>" />
11:     <input type="password" name="password"/>
12:     <bean:write name="sbutton" property="renderButton"/>
13:     <input type="submit" value="Prev"/> | <input type="submit" value="Next"/>
14:   </form>
15: </body></html>
```

FIG.10

Apply for IBM Jobs step 1 2 3 4

Enter all of the information in the fields provided. You can move on to the next page by clicking the Next button below.

Peopleclick is registering users on behalf of IBM. IBM will be the sole owner and user of the candidate information in accordance with the IBM Privacy Policy.

\* = Required

| Field | Input |
|---|---|
| Name | *First [ ]  Middle [ ]  *Last [ ] |
| * e-mail Access? | Yes ○  No ○ |
| * If yes, Enter e-mail Address | [ ] (jdoe@us.ibm.com) |

(Required if you have e-mail access)

* Home Address [ ]
* City [ ]
* State or Province [ ▼ ]
* Country [ United States ▼ ]
* Zip/Postal Code [ ]
Country Phone Code [ 001 ]
(*) Home Phone    Area Code ( [ ] )  [ ] - [ ]
Work Phone       Area Code ( [ ] )  [ ] - [ ]  Ext. [ ]
Mobile Phone     Area Code ( [ ] )  [ ] - [ ]
School Phone     Area Code ( [ ] )  [ ] - [ ]
(*) Non-U.S. Phone [ ]
* How should we conatact you? [ ▼ ]
Best days/times to contact you by phone [ ]

[ Next ▷ ]

You have left the IBM Web site. IBM makes no representations regarding any other Web site which you may access through this one. Click here for more information.

Return to IBM Employment

DISPLAY CONTROL INFORMATION GENERATION

CROSS-REFERENCE TO RELATED APPLICATIONS

This application is a continuation of commonly-owned, co-pending U.S. application Ser. No. 11/081,072, filed on Mar. 15, 2005.

FIELD OF THE INVENTION

The present invention relates to a method and a mechanism for generating a control instruction for displaying a document and the like in a style conforming to a terminal used by a user.

BACKGROUND OF THE INVENTION

Along with diffusion of Web-base technology, a so-called thin-client system configured to utilize a Web browser as a user interface and operate an application program on a Web server (an application server) has been put into practice. In this case, information to be transmitted from a server to a client may include hypertext markup language (HTML) documents containing forms, the wireless markup language (WML) defined as standard by the Open Mobile Alliance the Compact HTML which is a subset language of the HTML, and the like. As long as a client terminal can run a Web browser, the client can execute an application program without performing operations such as deploying or installing of the application program prior to the execution. Moreover, generally speaking, the client can operate such an application program by use of lower-processing performance hardware as compared to a case of executing the application program inside the client terminal.

The following documents are considered:
[Patent document 1], Japanese Patent Publication No. 3202968
[Patent document 2], Japanese Unexamined Patent Publication No. 2000-194612
[Patent document 3], Japanese Unexamined Patent Publication No. 2000-76473
[Patent document 4], Japanese Unexamined Patent Publication No. 9-204285

A low-end personal computer (PC) has been conventionally applied to the client terminal for the above-mentioned purpose. However, there are even lower-processing performance and lower-cost terminals designed to run the Web browser recently, including, personal digital assistants (PDAs), handheld PCs, set-top boxes, car navigation systems, and the like. Other new terminal devices including Web browser capability, such as cellular telephones, have also been developed. Therefore, in some cases, usability of these terminals may be considerably degraded. For example, a Web page, which is optimized for display on a PC having a wide display area, may require continual scrolling operations on a PDA having a smaller display area. In this concern, there has been a conventional technique which provides a data structure for optimizing a Web screen including a form from a device-independent hierarchical structure description to various terminal screens and an algorithm thereof (see Patent document 1, Patent document 2, and Patent document 3, for example.)

Meanwhile, there has been another conventional technique which is configured to invoke a corresponding validator at a point when an input field is partially inputted (at a point when a page of a divided form is switched to another page) by use of a constraint solving system (see Patent document 4, for example).

According to the conventional method disclosed in Patent document 1, Patent document 2, Patent document 3, and the like, the form can be converted into an appropriate structure as long as a logical structure of a screen is appropriately instructed as a device-independent description when producing an application program. However, a validator existing in the application program is not taken into consideration. Accordingly, while communication with a server takes place upon transition between divided pages, a form validator does not work until pressing a "submit" button at the end. Hence, there is a problem in terms of the usability. Moreover, even when the validator finds an error, it is not possible to display the position with the error immediately because the display begins from the first page of the divided screens (or from an index page). Accordingly, it takes some time for correcting and the usability is thereby degraded. In addition, it is naturally impossible to achieve appropriate division unless a structure such as grouping is described when defining screens.

Meanwhile, according to Patent document 4, an appropriate validator can be operated at a point when a page of a divided form is switched. However, if relations between input fields or validators, for example, semantically related input fields (or input fields supposed to be validated simultaneously by validators) such as input fields for state prefecture, city, or name of street, concerning a mode of dividing the form, are not taken into consideration, such input fields may be divided into mutually different screens. For this reason, the validators do not work in the course of transition of screens while inputting form data on these pages. In addition, it is not possible to view all the related data at once. Therefore, a user may be puzzled during an input operation. Further, the usability is degraded as modification screens are divided when the validators find an error.

Here, a Web form with validators for input values is defined as a page including various validators for input items (the input fields) on an input screen associated with processing by a Web application program, whose processing prepared in a form is executed when a user requests the processing by pressing the "submit" button and when all validations are completed (when all the validators return "OK" responses). If any one of the validators returns an NG response, an appropriate error message is returned to the user instead of performing the processing in the form and correction is requested to the user.

The validator can be configured to examine a single field by checking a type of a value (a numerical value or an electronic mail address format) in each input field, to check a constraint between a plurality of values, and to check whether the user completed the input, for example. The validator is provided as a program code to be executed by the server, or as a script program on a Web document to be executed by the terminal.

When a particularly complicated input screen in such a form (the Web form) is displayed on a terminal having a different screen size, the original input screen needs to be divided appropriately. Here, the appropriate division needs to meet the following requirements that the user can easily operate divided screens during the inputting operation in conformity to a screen size of the terminal or a user interface thereof, and that the user can correct an error easily upon occurrence of an input error. To be more precise, the appropriate division needs to meet the following requirements that a validator is operated at a point when transition is performed between the divided screens so as to immediately validate information inputted in the previous screen, that it is easy to access a suitable page when an error is found by the validator, and that a "submit" button cannot be pressed when it is obvious that the validator will inevitably find an error, that is, "submit" button for the form input can be pressed only when the form input has a possibility to pass the validation.

For example, considering a login screen having fields for a user ID and a password, a user will be surely puzzled if the fields for the user ID and the password are divided into different screens. It is because that the user cannot confirm the user ID inputted on the different screen in the course of inputting the password. Meanwhile, there are two conceivable reasons for a login error, namely, a user ID error and a password error. If these fields exist on mutually different screens, the user has to turn the pages back and forth upon occurrence of such an error, because it is possible to display only one of these pages at a time. In another example, when considering the case of dividing a form including very many input items such as an address (state prefecture, name of city, name of street), a telephone number, a company name, and the like, it is considered to be natural for a user to move back and forth freely among the input items and input them when inputting such diverse information. In this case, when the user completes the input and tries to submit the information, the user may not be always located on the final page where the "submit" button is provided. Accordingly, the usability for the user is degraded. On the contrary, incomplete input information may be submitted although all of the inputs are not completed yet if the "submit" button is provided on every page. In this case, the user will result in viewing unnecessary execution of error processing and error screens. Such a situation is also unfavorable.

Here, when the mutually related and complicated Web forms having many input items are divided into small screens such as a screen for a cellular telephone, the following conditions must be satisfied in light of the above-described usability (Requirements for division).
(Condition 1)
A size for one page after the division cannot exceed an upper limit attributable to limitations of the screen size and the receive buffer of the terminal.
(Condition 2)
Input fields for reference by one validator are not ought to be distributed to two or more divided forms.

Moreover, in consideration of a favorable situation for a user, it is preferable that the following two conditions are also satisfied.
(Condition 3)
The number of the divided pages should be minimized while satisfying the condition 2.
(Condition 4)
The largest divided pages in a page set from a result of division satisfying the condition 2 are compared with the largest pages from one another result, and the result of division where the size of the largest pages in the page set is smallest should be selected. In other words, the sizes of the divided groups are well balanced.

SUMMARY OF THE INVENTION

The present invention has been made to solve the foregoing technical problems. An aspect of the present invention is to enable division and execution of validation codes in conformity to division of form elements when a mutually related and complicated Web form having many input items is divided into small screens such as screens for a cellular telephone.

Another aspect of the present invention is to provide an automatic division algorithm, such as one satisfying the above-described four conditions, so as to be able to flexibly deal with arbitrary terminals having various capacities.

Still another aspect of the present invention is to provide an automatic division algorithm to divide forms in conformity to a screen size of a terminal or to a user interface thereof, so that a user can operate the forms easily and correct an error easily upon occurrence of an input error.

Yet another aspect of the present invention is to provide an automatic generation method of a divided form screen for adding status indicators of validators and a "submit" button. To attain the aspects, the present invention provides a data structure and an algorithm for achieving optimization corresponding to various terminal screens, which have configurations that validators are operated as much as possible at a point when transition is performed between divided screens so as to immediately validate information inputted in the previous screen, that it is easy to access a corresponding page when an error is found by the validator, that it is possible to press a "submit" button for a form input only when the form input has a possibility to pass the validation, and so forth.

BRIEF DESCRIPTION OF THE DRAWINGS

For a more complete understanding of the present invention and the advantages thereof, reference is now made to the following description taken in conjunction with the accompanying drawings.

FIG. 8 is a view showing an example of a JSP code to be generated.

FIG. 10 is a view showing apart of a page of a job application form in a Web site provided by the applicant.

DETAILED DESCRIPTION OF THE PREFERRED EMBODIMENTS

Figure 1:
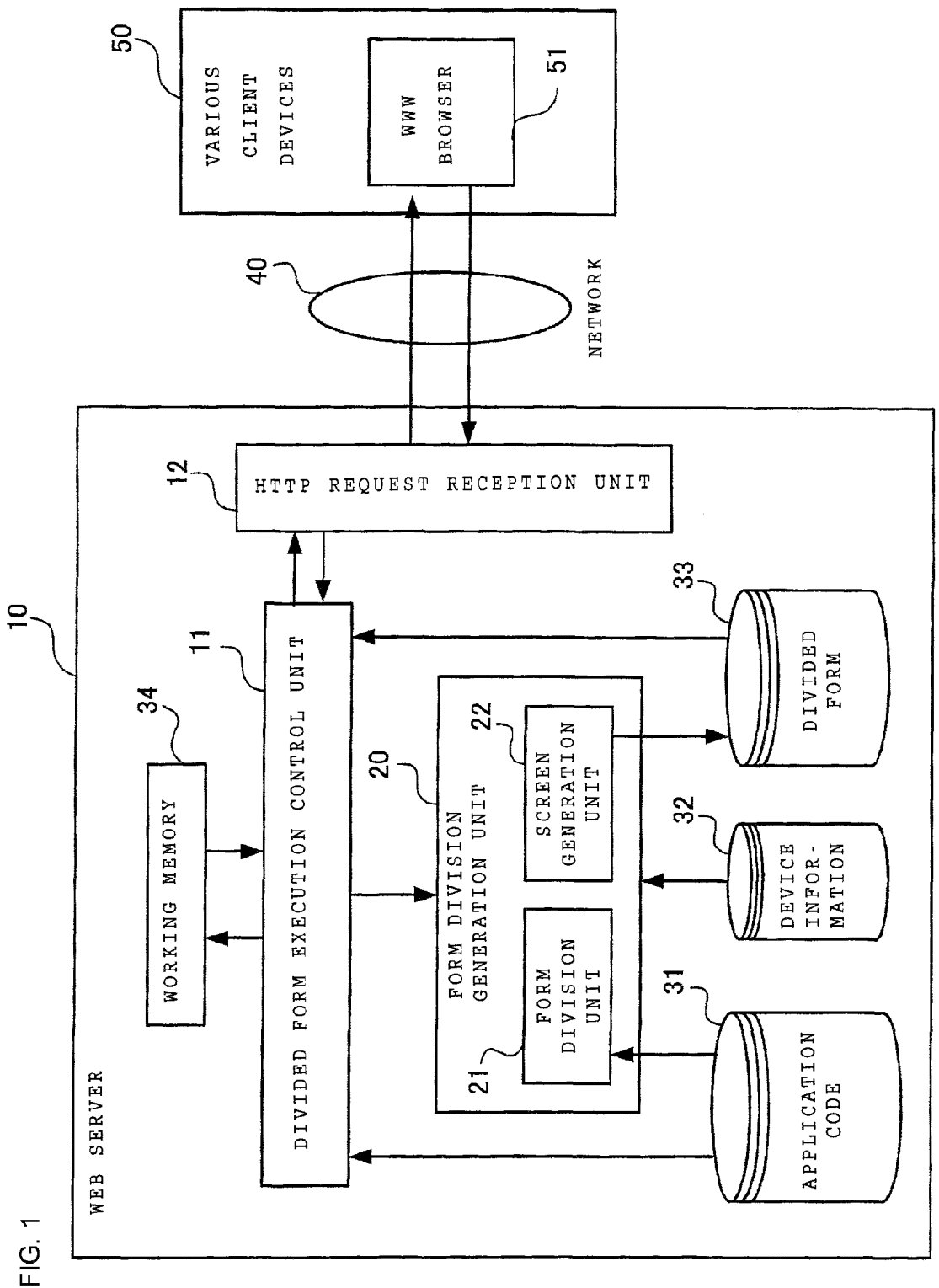
FIG. 1 is a view showing a configuration of a form automatic division system applying an embodiment.

The present invention enables division and execution of validation codes in conformity to division of form elements when a mutually related and complicated Web form having many input items is divided into small screens such as screens for a cellular telephone.

The present invention provides an automatic division algorithm, such as one satisfying the above-described four conditions, so as to be able to flexibly deal with arbitrary terminals having various capacities. That is to say, when the form is divided as described above or when page templates of divided forms are produced in advance during the design, for example, then it is preferable to display states of input fields and statuses of completion of the respective validators during the execution, and to perform automatic placement of a "submit" button dynamically.

The present invention also provides an automatic division algorithm to divide forms in conformity to a screen size of a terminal or to a user interface thereof, so that a user can operate the forms easily and correct an error easily upon occurrence of an input error. The present invention also provides an automatic generation method of a divided form screen for adding status indicators of validators and a "submit" button.

In an embodiment, the present invention provides a data structure and an algorithm for achieving optimization corresponding to various terminal screens, which have configurations that validators are operated as much as possible at a point when transition is performed between divided screens so as to immediately validate information inputted in the previous screen, that it is easy to access a corresponding page when an error is found by the validator, that it is possible to press a "submit" button for a form input only when the form input has a possibility to pass the validation, and so forth. Specifically, the present invention provides a method of generating display control information for dividing and displaying a form in a style conforming to a terminal used by a user, which includes the steps of: receiving a form request from the terminal; acquiring a terminal capacity of the terminal transmitting the form request; reading a screen definition of the form subjected to the form request and a code of validators for executing validation of an input value inputted to an input item in the form out of a storage device; dividing the form in conformity to the acquired terminal capacity by use of the read-out screen definition of the form and the read-out validators; and transmitting a sub-form obtained by division to the terminal.

Here, the dividing step can be characterized in that a reference relation between the validator and the input item is derived, and that grouping of the input items is performed so as to categorize the input items referenced by the same validator in the same group. Moreover, the dividing step can be characterized in that a judgment is made as to whether or not the size of the group obtained by the grouping is equal to or below a size based on the terminal capacity, and that the reference relations are modified by copying the input items which are referenced by two or more different validators in the group exceeding the size.

Here, it is preferable in light of a possibility to minimize the number of divided pages if the method further includes a division adjustment step of adjusting the groups, in terms of the groups obtained by the grouping in the dividing step, so as to allow a result by merging all adjacent groups to exceed the terminal capacity. In addition, if the method further includes a step of generating a user interface for acquiring an input for an input item of the sub-form by a user, and for indicating the status of the validator having a reference relation with the input item to the user, it is excellent in that the usability for the user is further enhanced.

From another perspective, a display control information generation method applying the present invention includes the steps of: reading a screen definition of a form and a code of validators for executing validation of an input value inputted to an input item in the form out of a storage device and dividing the form in conformity to a terminal capacity of a terminal; generating a display user interface for displaying an internal state including a state of each input item of the form and a state of the validator together with a sub-form obtained by division; and providing the generated display user interface to the terminal.

Here, the display user interface can be characterized by displaying correlations between a specific sub-form obtained by division and the validators. For example, the display user interface can be configured to demonstrate the respective validators by categorizing the validators into regions corresponding to relevant sub-forms so as to clarify the correlations therebetween. Alternatively, the display user interface can be characterized in that a position of a currently displayed sub-form with respect to the entire form is explicitly displayed. In addition, it is preferable in light of capability for a user to operate the divided screens directly if the method further includes the step of providing a relevant sub-form among the sub-forms obtained by division with a hyperlink to a different sub-form.

Meanwhile, the present invention provides a computer for generating display control information for dividing and displaying a form in a style conforming to a terminal used by a user, which includes: request receiving means for receiving a form request from the terminal; storing means for storing a screen definition of the form subjected to the form request and a code of validators for executing validation of an input value inputted into an input item in the form; terminal capacity acquiring means for acquiring a terminal capacity of the terminal transmitting the form request; dividing means for dividing the form in conformity to the terminal capacity acquired by the terminal capacity acquiring means by use of the screen definition of the form and the code of the validators read out of the storing means; and screen generating means for generating screen information to be displayed on the terminal by use of a result of division by the dividing means.

Here, the dividing means can be characterized by including at least any of a function to divide the form so as to prevent a size for one page after the division from exceeding an upper limit attributable to limitations of a screen size and a receive buffer of the terminal, and a function to divide the form so as to prevent input items to be referenced by one validator from belonging to two or more divided forms. Furthermore, the dividing means can be characterized by dividing the form so as to minimize the number of divided pages of the form and by comparing the sizes of the largest pages in a set of pages as a result of different divisions of the form and dividing the form by use of division which minimizes the size of the page.

In addition, the screen generating means can be characterized by being configured to generate the screen information for displaying an internal state including a state of each input item of the form and a state of the validators together with a sub-form obtained by division.

Moreover, the present invention can be implemented as a program to be executed by various computers such as a Web server. This program directs a computer to divide and display a form in a style conforming to a terminal used by a user by achieving functions of: acquiring a terminal capacity of a terminal transmitting a form request; reading a screen definition of the form subjected to the form request and a code of validators for executing validation of an input value inputted into an input item in the form out of a storage device; and dividing the form in conformity to the acquired terminal capacity by use of the read-out screen definition of the form and the read-out validators.

Here, the function of dividing the form can be characterized in that reference relations between the validators and the input items are derived, and that grouping of the input items is performed so as to categorize the input items referenced by the same validator in the same group. Moreover, the function of dividing the form can be characterized in that a judgment is made as to whether or not the group obtained by grouping is equal to or below a size based on the terminal capacity, and that the reference relations are modified by copying the input items which are referenced by two or more different validators in the group exceeding the size.

From another perspective, a program applying the present invention directs a computer to divide and display a form in a style conforming to a terminal used by a user by achieving functions of: reading a screen definition of a form and a code of validators for executing validation of an input value inputted to an input item in the form out of a storage device and dividing the form in conformity to a terminal capacity of a terminal to output contents of the form; and generating a display user interface for displaying an internal state including a state of each input item of the form and a state of the validator together with a sub-form obtained by division.

Here, the program can be characterized by further including a function of providing a relevant sub-form among the sub-forms obtained by division with a hyperlink to a different sub-form, and in that the function of generating the display user interface applies the provided hyperlink to the display of the internal state.

According to the present invention, it is possible to provide automatic division algorithm to execute form division when providing the form to a low-performance terminal having a small display screen, in order that a user can operate the forms easily and to correct an error easily upon occurrence of an input error.

Now, an embodiment of the present invention will be described in detail with reference to the accompanying drawings. FIG. 1 is a view showing a configuration of a form automatic division system applying an embodiment of the present invention. A system configuration in executing an application program includes a Web server 10 connected through a network 40, and various client devices 50 which are terminals.

Although the client device 50 has a variety of performances such as a screen size and a memory capacity, the client device 50 includes a World Wide Web (WWW) browser 51 which can request a WWW document to the Web server 10, receive and process the WWW document.

The network 40 may be either a public wide area network such as Internet, or a local network.

Meanwhile, the Web server 10 includes a divided form execution control unit 11 and a hypertext transfer protocol (HTTP) request reception unit 12. The Web server 10 further includes an application code database DB 31, a device information DB 32, and a divided form DB 33 as various databases (DBs) to be stored in a storage device such as a hard disk drive (HDD). Moreover, the Web server 10 includes a working memory 34 composed of a random-access memory (RAM) as an operational memory for the divided form execution control unit 11.

The HTTP request reception unit 12 also includes processing codes for processing requests other than those concerning the divided form (a sub-form) such as processing codes corresponding to functions of a standard Web server or logic execution of an application program. Meanwhile, the divided form execution control unit 11 includes a form division generation unit 20 as a subsystem, thereby controlling execution of divided forms in response to a request from the client device 50 by use of an application program execution code or a form subjected to division (the divided form) as an input. In this case, the working memory 34 is used to save states of the form and respective input fields thereof as well as states of validators temporarily.

A Web application program to be executed by the Web server 10 is composed of a set of screen definitions and processing codes. Particularly, concerning the form processing, the Web application program is composed of form screen definitions, validator codes for inputs (validators), and form processing codes. These elements are produced by a developer of the web application program and are inputted to the form automatic division system shown in FIG. 1. Note that, for example, there may also be a case where the validator codes are not explicitly given such as checks for incomplete inputs, length of character strings or checks for types of input values. However, in this embodiment, it is considered that explicit codes can be also used even in such a case.

Here, in this embodiment, a form including validators for input values (Web form) is defined as an input screen including various validators for input items (input fields) associated with processing by a Web application program, and to execute the processing prepared in the form when a user of the client device 50 requests processing by pressing a "submit" button and when all validations are completed (when all the validators return "OK" responses). If any one of the validators returns an NG response, an appropriate error message is returned to the user instead of performing the processing in the form and correction is requested to the user.

Moreover, the validator (the validator code) checks a single field such as checking a type of a value (a numerical value or an electronic mail address format) in each input field, checks a constraint between a plurality of values, and checks whether the user completed the input, for example. These validators are provided as program codes to be executed by the Web server 10, or as script programs on a Web document to be executed by the client device 50.

The form division generation unit 20 is controlled by the divided form execution control unit 11. When necessary, the form division generation unit 20 reads form definitions (before division) (the form screen definitions), the validator codes, and the form processing codes out of the application code DB 31 which is the storage device, and thereby outputs divided forms to the divided form DB 33. In this case, the form division generation unit 20 reads device information to be a target out of the device information DB 32, and performs division in conformity to a performance of a terminal by use of the device information. As additional subsystems of the form division-generation unit 20, there are a form division unit 21 for dividing items in a form and a screen generation unit 22 for generating pages from the divided forms. Here, this form division-generation unit 20 may be also configured to generate divided forms in advance by being operated not only runtime but also development time of an application program.

The form division unit 21 divides the provided forms in conformity to the capability of the terminal to be the target (the client device 50) while applying the screen definitions of the respective forms and the validators (written in the Java language, for example) for executing validation of the input values inputted to fields in the forms (the input fields) as the inputs. The screen definition of the form may be written, for example, in the extensible markup language (XML) such as the XForms or may be written in a markup language directly executable by the terminal such as the HTML. Here, the "Java" and titles related thereto are trademarks or registered trademarks. In this specification, the respective descriptions will be omitted.

The screen generation unit 22 generates Web page templates (such as Java Server Pages (JSP) files) of the terminal to be the target (the client device 50) while applying a result of division of the form division unit 21 (expressed as groups of the input items as described later) as the input. The form division unit 21 and the screen generation unit 22 may be operated at the design and development stage of the Web application program when the capability of the terminal is known beforehand, or may be operated dynamically when executing the application program.

The divided form execution control unit 11 performs interaction processing with the user (the client device 50) upon execution of the application program while applying the Web page templates of the divided forms, the validator codes, and the form processing codes as the inputs, and thereby retrieves necessary codes. This divided form execution control unit 11 and the form division generation unit 20 which is the subsystem thereof are programs to be operated on the Web server 10 (Servlet codes written in the Java2 Enterprise Edition (J2EE), for example). When operating the form division at an actual point of the request, the form division unit 21 and the screen generation unit 22 are operated on the Web server 10 similarly.

Figure 2:
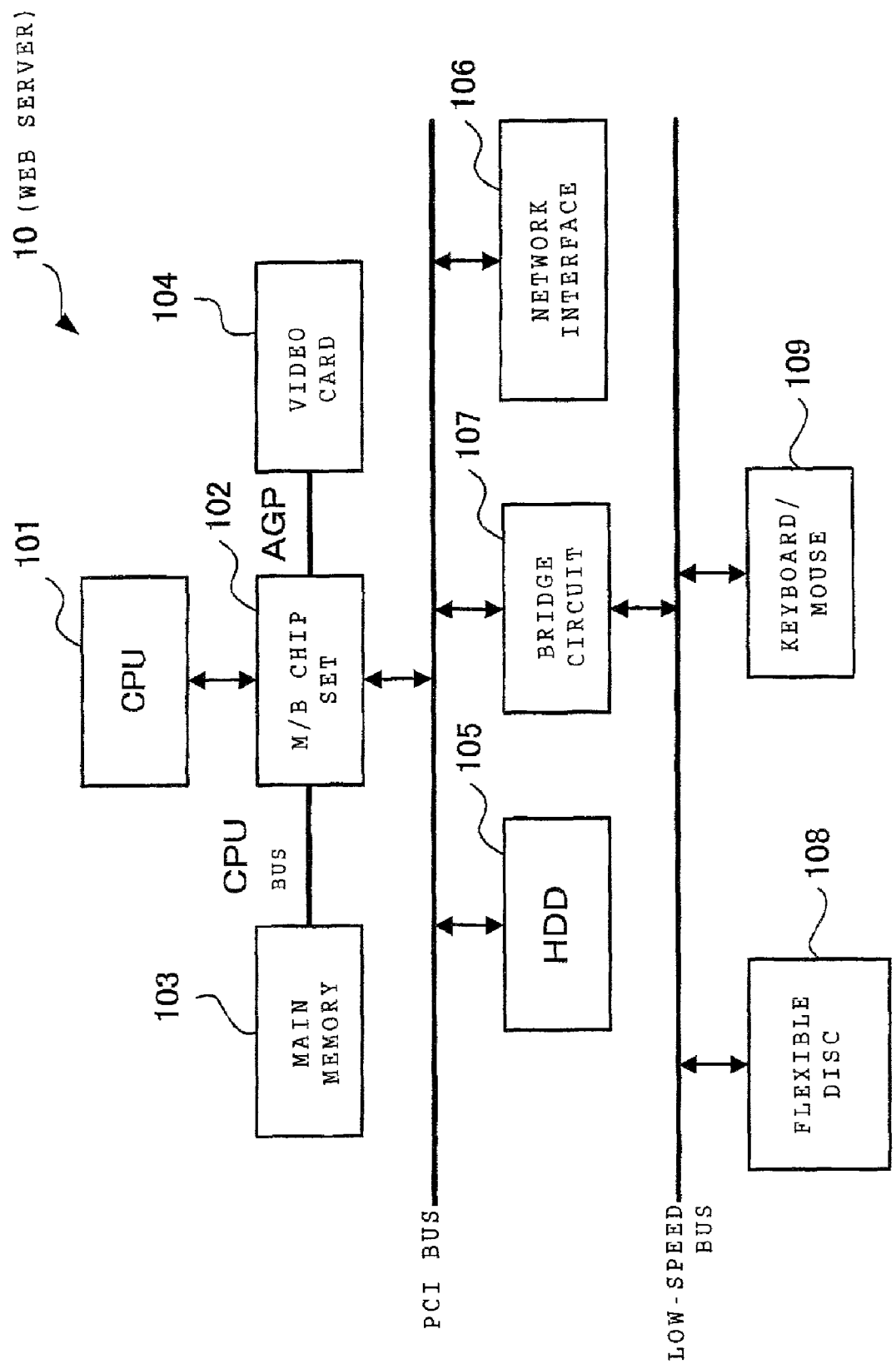
FIG. 2 is a view schematically showing an example of a hardware configuration of a computer device suitable for realizing a Web server and various client devices applying the embodiment.

Here, a hardware configuration of the Web server 10 will be described. FIG. 2 is a view schematically showing an example of a hardware configuration of a computer device suitable for realizing the Web server 10 and the various client devices 50 applying this embodiment. It is to be noted, however, that some constituents thereof may be omitted as appropriate if a simple computer device such as a cellular telephone is used as the client device 50.

The computer device shown in FIG. 2 includes a central processing unit (CPU) 101 which is operating means, a main memory 103 connected to the CPU 101 through a motherboard (M/B) chip set 102 and a CPU bus, and a video card 104 similarly connected to the CPU 101 through the M/B chip set 102 and an accelerated graphics port (AGP). The computer device further includes a magnetic disk device (the HDD) 105 connected to the M/B chip set 102 through a peripheral component interconnect (PCI) bus, a network interface 106, and a flexible disk drive 108 and a keyboard/mouse 109 connected to the M/B chip set 102 through this PCI bus, a bridge circuit 107, and a low-speed bus such as an industry standard architecture (ISA) bus.

It is to be noted that FIG. 2 only shows one example of the hardware configuration of the computer device for realizing the embodiment and that other various configurations can be adopted as long as such configurations can apply this embodiment. For example, it is possible to adopt a configuration in which only a video memory is incorporated instead of providing the video card 104 while allowing the CPU 101 to process image data. Alternatively, it is also possible to provide a drive such as a compact disc recordable (CD-R), or a digital versatile disc random access memory (DVD-RAM) drive through an interface such as an AT attachment (ATA) or a small computer system interface (SCSI).

Next, processing operations of the divided form execution control unit 11, the form division generation unit 20, the form division unit 21, and the screen generation unit 22, which are the functions to be executed by the CPU 101, will be described in detail.

Firstly, as prerequisites of the division, the processing is executed in this embodiment based on the four "requirements for division". Although the requirements have been mentioned already, the requirements are again cited herein.

"Condition 1"

A size for one page after the division cannot exceed an upper limit attributable to limitations of the screen size and the receive buffer of the terminal (the client device 50). (This is a physical restriction, which is a strict constraint to be satisfied at any time.)

"Condition 2"

Input fields to be referenced by one validator do not belong to two or more divided forms. (Although there may be a case where this condition is not satisfied simply by applying the condition 1, such a trouble can be solved by copying and replacing the input items and the validators.)

"Condition 3"

The number of divided pages is minimized while division satisfying the condition 2 is performed. (Practically, the number may be approximately minimized.)

"Condition 4"

While there are a plurality of results of division satisfying the "condition 2", the sizes of the largest pages in a set of pages by division are compared with the sizes of the largest pages by one another division. Thereby, the result of division where the sizes of the largest pages in the set of pages is smallest should be selected. In other words, the sizes of the divided groups are well balanced. (Practically, the size may be approximately minimized.)

Here, the input items (the input fields) in the form are not always independent respectively but tend to be semantically related to one another. Accordingly, it is preferable to achieve the division while reflecting such relations. Additionally, such semantic relations are estimated by an aspect in which a certain validator makes reference to the related input values. Moreover, division of the form in a style corresponding to the validators has the following advantages upon occurrence of an error, namely, (1) that the user can easily recognize the location of the error, and (2) that it is easy to navigate the user to the location of the error. Further, it is also possible to display results of validations corresponding to the respective validators on the divided screen, and to provide hyperlinks of result display so as to facilitate direct operations by the user. In this way, it is possible to improve usability for the user.

It is preferable to dispose a "submit" button automatically only when there is a possibility to complete the validation by all the validators after completing the input to the current page. This "submit" button can be disposed on the condition that the validators which are not related to the current page complete the validations and that the validator which is related to the current page becomes operable state by inputting to this page. The operable state of the validator means a state where reference to a value in the input item is available (due to completion of an input by the user or completion of a pre-setting by the user).

Figure 3:
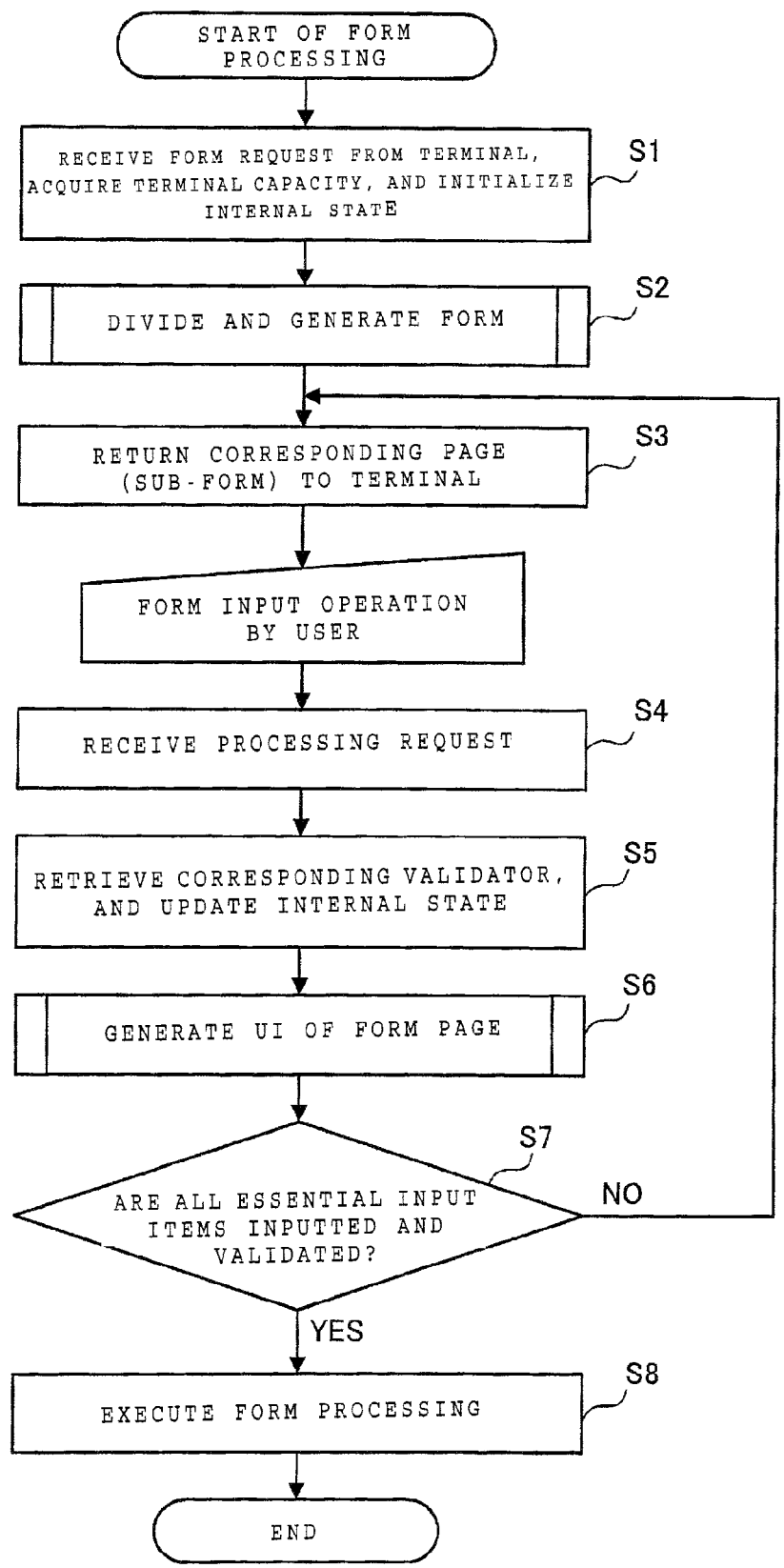
FIG. 3 is a view showing an overall flowchart from form division to execution control of divided forms.

FIG. 3 is a view showing an overall flowchart from the form division to the execution control of the divided forms. As for the form processing, firstly a form request from the terminal to be the target (the client device 50) is received in Step 1. Moreover, a terminal capacity is acquired and specified. The acquisition and specification of the terminal capacity is achieved in a dynamic manner, upon execution, by searching a repository by use of identification information from the terminal (such as user-agent header information according to the HTTP), for example. Alternatively, the terminal capacity may be acquired directly from the terminal by use of a standard specification such as a user agent profile (UAProf) according to the open Mobile Alliance (OMA). In addition, an internal state of the Web server 10 is initialized.

Next, division of the form and generation of sub-form pages (the Web page templates) are performed in Step 2. The processing in the Step 2 may be executed in advance at the design and development stage. The processing in Step 2 will be described in detail with reference to FIG. 4 and succeeding figures.

Thereafter, in Step 3, an actual screen document (the corresponding pages (the sub-forms), for example, a document written in a markup language such as an HTML document or a WML document which can be handled by the terminal to be the target) is generated from the generated sub-form pages (the Web page templates) and is returned to the terminal (the client device 50). Then, various form input operations are executed by the user of the terminal (the client device 50) which acquires the sub-forms. For example, the user may receive the divided forms, perform the input processing to jump to a different page, or press the "submit" button to request the form processing if possible.

In Step 4, a processing request from the user is received from the terminal (the client device 50). The processing request received herein mainly includes acquisition of the values of the input items in the forms, and determination of the "submit" processing and the navigation processing to a different page. Moreover, the necessary processing concerning security or authentication is also included herein.

In Step 5, the corresponding validator is retrieved and internal states are updated. The internal states may include, for example, a state concerning each input item in the form (such as a "not inputted" state, an "inputted" state, or a "preset" state), an actually inputted value, a state of each of the validators (such as an "OK" state, an "NG" state, or a "not validated" state), and the divided form page currently in process. These internal states are initialized in Step 1. When updating the internal states, the internal states of the input items corresponding to the inputted items are modified. In addition, the validators are operated when reference to all the input items to be referenced by the respective validators become available (in the states other than the "not inputted state"), and the states of the respective validators are thereby updated. Moreover, when there is the request for screen navigation, the current page is updated as designated.

In Step 6, a user interface for transmitting the internal states updated in Step 5 appropriately to the user is dynamically generated. The processing in this step will be described in detail with reference to FIG. 7.

Thereafter, a judgment is made in Step 7 as to whether or not all the essential input items are inputted and validated. Specifically, when the "submit" button is pressed, an investigation takes place as to whether or not all the essential input items are inputted and whether or not all the validators are in the "OK" state. When the above-described conditions are satisfied, the processing proceeds to Step 8. When the conditions are not satisfied, the processing returns to Step 3 and the interaction processing with the user is to be repeated.

In Step 8, the provided form processing is executed. Although it is omitted in the flowchart shown in FIG. 3, it is conceivable that the processing returns to Step 3 as error processing when an error occurs at this stage. When the processing is completed normally, the provided form processing is completed. Here, in the case of the Web application program, a plurality of pieces of the form processing are frequently executed in combination. In this case, the entire processing shown in FIG. 3 is to be repeated.

Next, the division generation processing of the form shown in Step 2 will be described.

Figure 4:
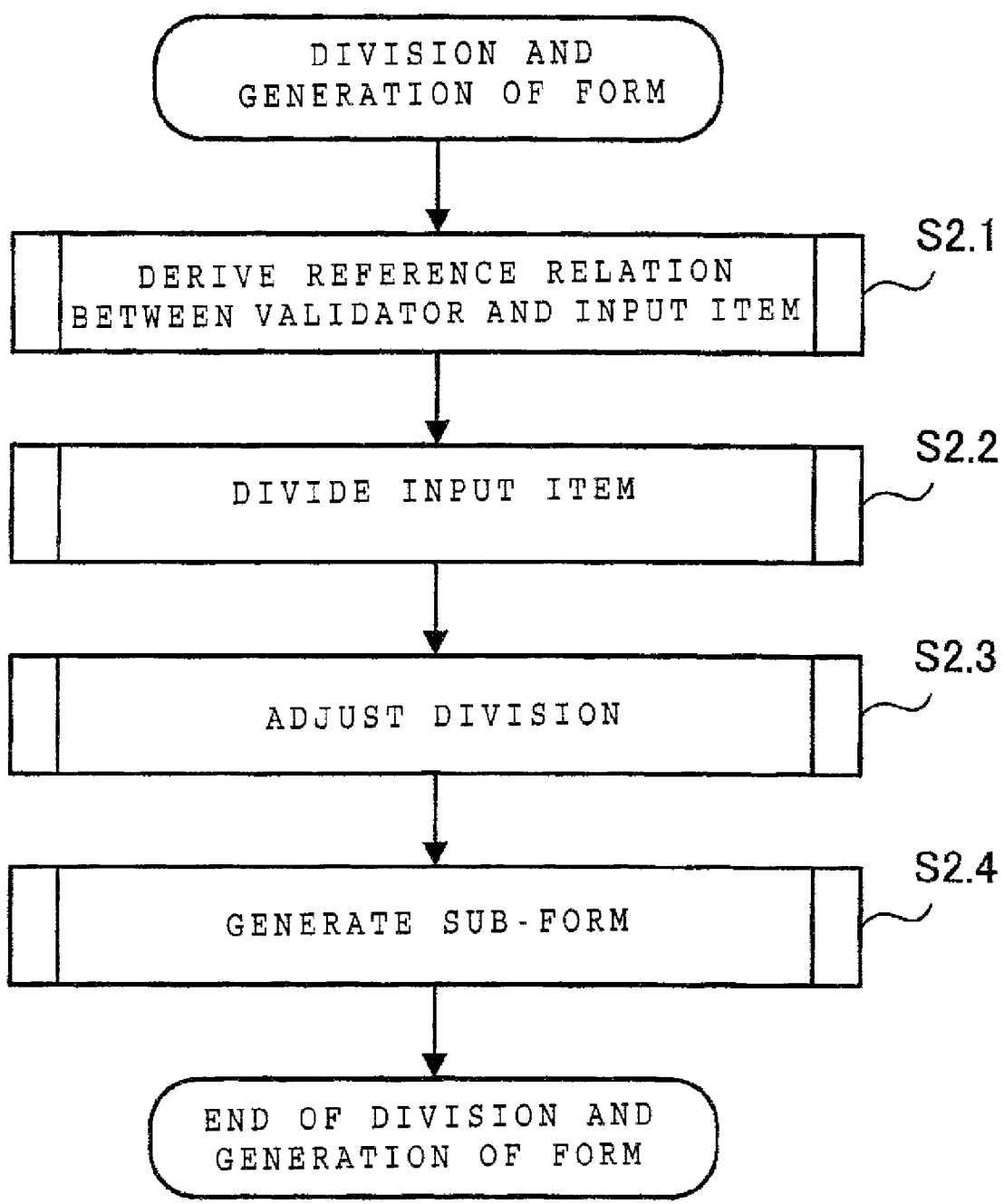
FIG. 4 is a flowchart showing an overall flow of division generation processing of the form.

FIG. 4 is a flowchart showing an overall flow of the division generation processing of the form.

Here, firstly, a reference relation between the validator (the validator code) and the input item (the input field) is derived (Step 2.1). Specifically, the program code of the validator is analyzed and the input item field to be referenced by the validator is clarified. Such a reference relation may be found by use of the conventional techniques such as the compiler technique (a code analysis or a data flow analysis) or program slicing. Practically, it is usually sufficient to carry out an approximate analysis by means of pattern matching of program character strings. Here, it is also possible to find the reference relation between the validator and the input item field in advance before executing the application program.

Subsequently, the form division unit 21 in the form division generation unit 20 divides the input items (Step 2.2). Here, input item groups are divided into sizes equal to or below a predetermined size to be determined by the screen size and the like. The division processing will be described in detail with reference to FIG. 5.

Meanwhile, the form division unit 21 further performs adjustment so as to optimize results of division in Step 2.2 (Step 2.3). To be more precise, small groups are combined together so as to form an appropriate screen size when appropriate. In addition, concerning a group for which it was unable to divide in Step 2.2, one exceeding a screen size subjected to the physical constraint is divided. The division adjustment will be described in detail with reference to FIG. 6. Here the screen size of the provided terminal (the client device 50) of the screen is defined by a display capability (such as longitudinal and lateral pixel sizes of the display content after rendering), a maximum capacity of a receive buffer depending on the number of characters in a transmitted document, or the like. In reality, there may be a case where it is difficult for the Web server 10 to know a rendering result or a case where it is difficult to know the accurate number of characters in the transmitted document due to inclusion of a dynamic result therein. For this reason, it is also possible to use different evaluation criteria which are approximate to the above-mentioned values. For this example, it is also effective to use the number of the input items included in the page after division as the aforementioned size (it is also possible to perform weighting depending on the type of the input field).

Lastly, sub-forms are generated (Step 2.4). Specifically, an operation for converting the obtained results of division into a document in an expressive form, which can be displayed on the terminal (the client device 50), is performed. In this operation, appropriate coding conversion of the contents is executed in conformity to the terminal, whereby the results of division are converted into a document written in the markup language interpretable by the WWW browser 51 of the client device 50.

The terminal adaptation processing such as division or conversion to be executed in Step 2.3 and Step 2.4 can be carried out by use of the conventional techniques such as one disclosed in the above-described Patent document 1. Here, the converted documents include dynamic information (display of the error information or the input states, and the "submit" button to be displayed dynamically) at the time of execution processing. Accordingly, the converted documents are not final screen documents but are template documents which are capable of including the dynamic information. Such template documents may include Java server pages (JSP), active server pages (ASP), hypertext preprocessors (PHP), and the like.

Figure 5:
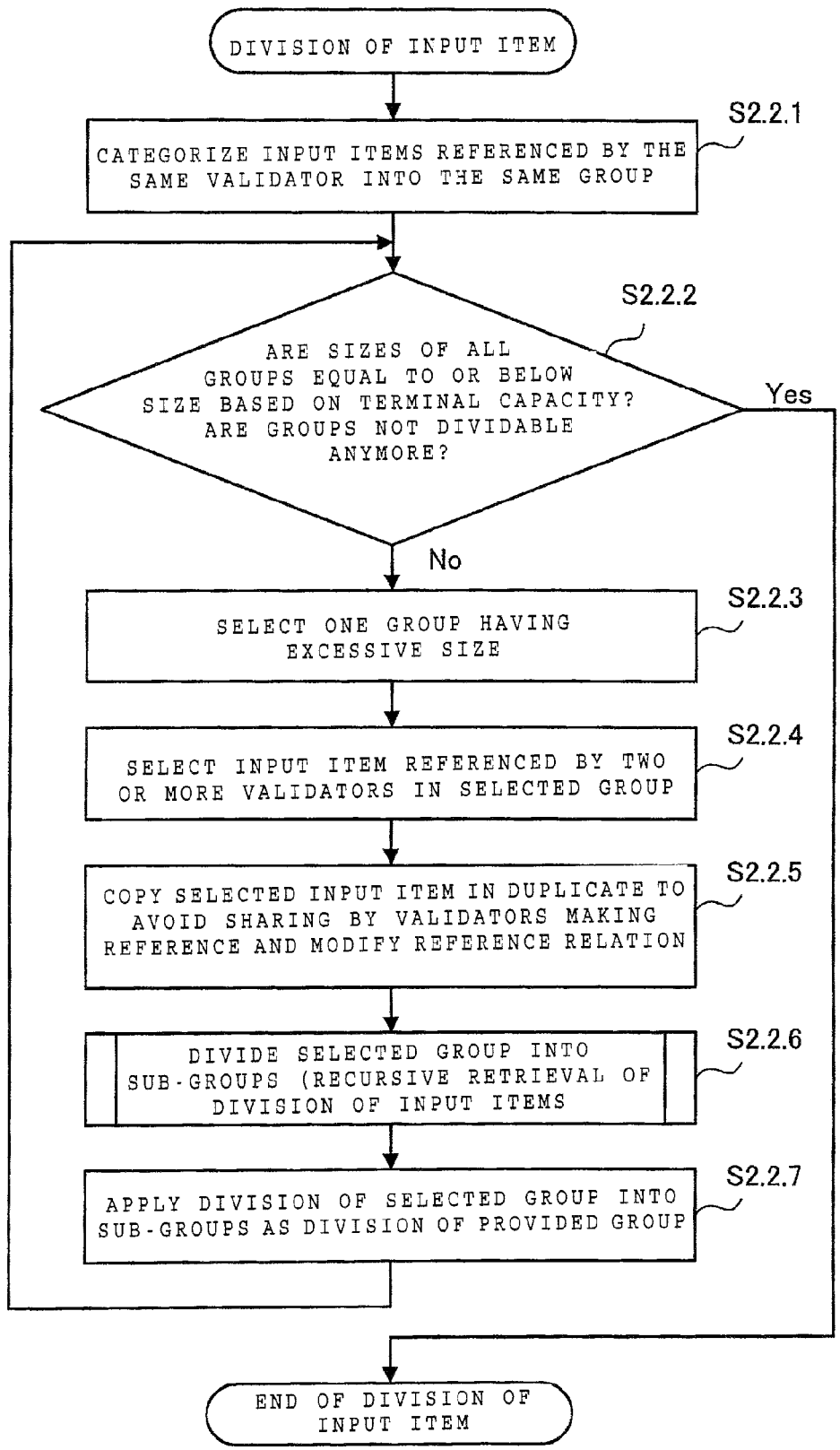
FIG. 5 is a flowchart describing in detail division processing of input items in Step 2.2 of FIG. 4.

FIG. 5 is a flowchart describing the detail of the division processing of the input items in Step 2.2 of FIG. 4. FIG. 5 shows a division algorithm of form input item groups using the reference information from the validators (the validator codes) to the input items (the input fields).

Here, firstly, grouping of the input items is performed so as to categorize the input items referenced by the same validator in the same group (Step 2.2.1). Specifically, concerning arbitrary input items A and B, the input items A and B are categorized in the same group if there is a validator V which makes reference to both of the input items A and B. As an example of the above-described algorithm, it is possible to conceive a method configured to categorize each item into each group in the beginning, then to examine all the validators in order, and to combine the groups to be referenced into one group when the above-described condition is satisfied (two or more groups are referenced).

Here, a judgment is made as to whether or not the sizes of all the groups become equal to or below the size based on the terminal capacity or as to whether or not it is impossible to further divide the form (Step 2.2.2). Specifically, the groups generated in Step 2.2.1 (the groups satisfying the above-described "condition 2" of the "requirements for division") are checked as to whether or not the groups also satisfy the above-described "condition 1". If the groups satisfy the "condition 1" as well, the subroutine for dividing the input items in Step 2.2.2 is completed. Here, if there are groups which exceed the size determined by the terminal, one of the groups having excessive size is selected (Step 2.2.3). Moreover, one input item, which is deemed to be most appropriate, is preferably selected among the input items to be referenced by two or more different validators out of the group (Step 2.2.4). The method of selecting the most appropriate input item will be described later.

Subsequently, the selected input item (the input field) is copied in duplicate. In this case, the reference relation is modified such that the original field and the copied field are referenced by different validators independently. Specifically, the selected input item is copied in duplicate so as not to be shared by the validators which make reference thereto, and the reference relations are modified accordingly (Step 2.2.5). When the input item is referenced by three or more validators, there are a plurality of copying methods conceivable herein. However, such selecting methods will be described later. Thereafter, the selected group is divided into sub-groups. Specifically, Step 2.2 is recursively called with applying the group having the copied input item as a new parameter (Step 2.2.6). Then, the division of the selected group into the sub-groups is applied as division of the provided group, in other words, the outputted division from the recursive call in Step 2.2 is applied to the current division (Step 2.2.7), and then the processing returns to Step 2.2.1. Here, when there are no more input items left which can be copied for the division, the above-described loop processing is completed (Step 2.2.2).

Meanwhile, the most appropriate input item is selected in the selection in Step 2.2.4. This step is equivalent to the satisfying of the "condition 3" and the "condition 4" shown in the above-described "requirements for division". Accordingly, to find the input item accurately, the processing in Step 2.2.5 and Step 2.2.6 (the copying and modifying the reference relations) are tested for all the input items which are referenced by a plurality of validators. Here, the number of divided pages and the size of the maximum sub-group are recorded in each case. Meanwhile, the copies and the modified reference relations are restored before carrying out the subsequent test. In this way, when all the tests are completed, the division where the smallest number of divided pages (that is, a way of copying and grouping input items) is achieved is selected. If there are a plurality of divisions where the smallest number of divided pages is achieved, a division where the maximum size of the sub-group is the smallest is selected. If there are still a plurality of applicable divisions, any one of the divisions can be selected arbitrarily. For example, it is possible to select the initial input item unconditionally. More practically speaking, the group having the largest size may be selected in Step 2.2.3 (if there are a plurality of applicable groups, it is possible to select anyone of the groups can be selected arbitrarily. Then the input item referenced by the most numerous validators is selected among the groups (similarly, if there are a plurality of applicable input items, it is possible to select any one of the input items arbitrarily). In this way, it is often possible to obtain a favorable result.

Figure 6:
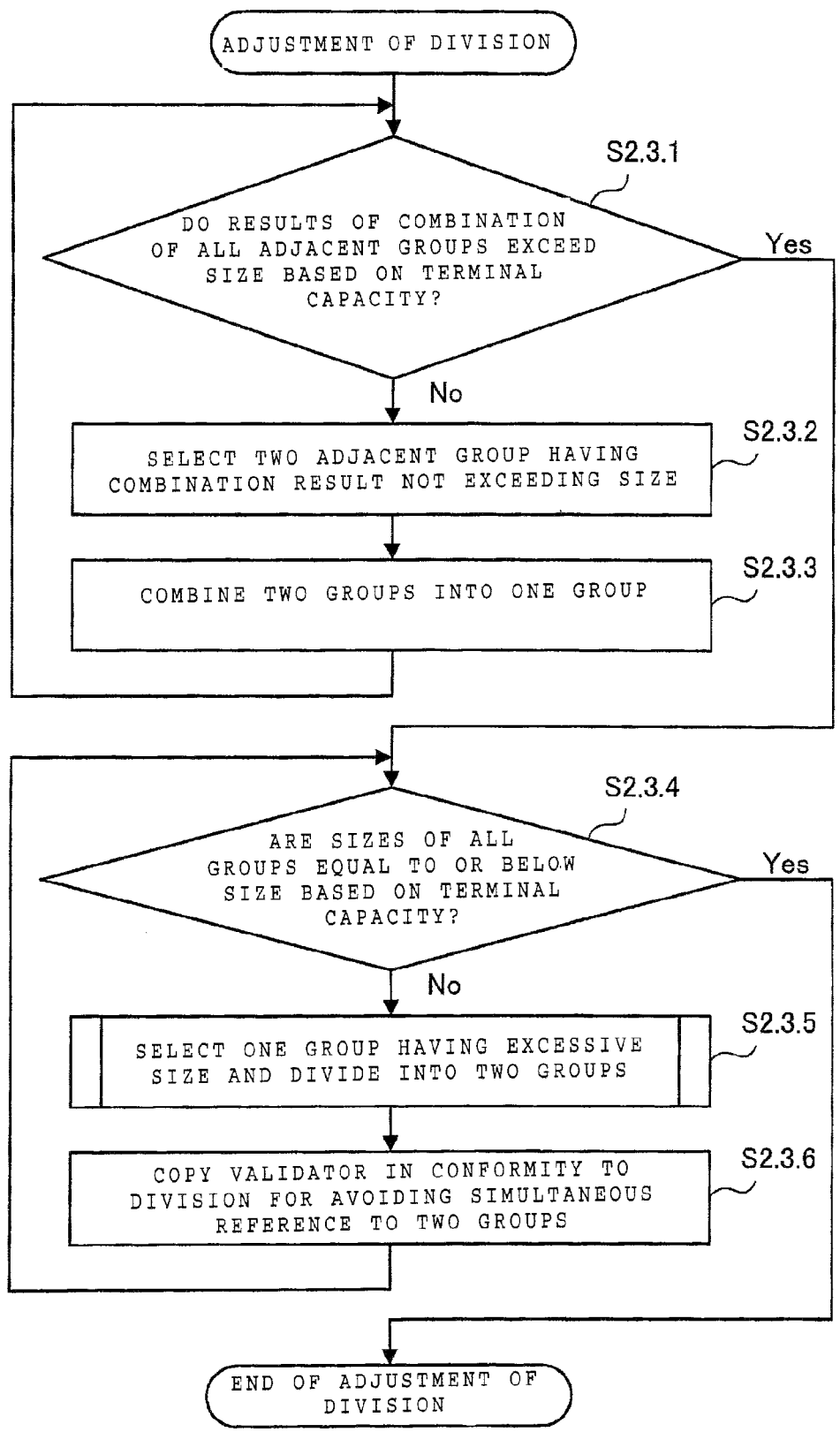
FIG. 6 is a flowchart describing in detail processing of adjustment of division shown in Step 2.3 of FIG. 4.

FIG. 6 is a flowchart describing in detail processing of the division adjustment shown in Step 2.3 of FIG. 4. Here, the processing aims at adjusting the division if the divided groups are excessively small or if the "condition 1" is not satisfied only by applying the "condition 21" shown in the "requirements for division". Here, firstly, results of merging among all adjacent groups are observed in order to minimize the number of divided pages. Then, a judgment is made as to whether or not each result of merging exceeds the size based on the terminal capacity of the client device 50 (Step 2.3.1). This step is equivalent to checking whether or not the "condition 3" shown in the "requirements for division" is satisfied. Here, "all the adjacent groups" are groups which are generated by dividing the form having sequentially ordered contents and are adjacent to one another. In case of exceeding the size based on the terminal capacity in Step 2.3.1, that is, when there are no more groups left for being combined, the processing jumps to Step 2.3.4. In case of not exceeding the size based on the terminal capacity, two adjacent groups having the result of merging not exceeding the size is selected (Step 2.3.2). Thereafter, the two groups thus selected are combined together and formed into one group (Step 2.3.3), and then the processing returns to Step 2.3.1. Here, to satisfy the "condition 4" shown in the "requirements of division", it is necessary to provide the selection order of Step 2.3.2. However, to obtain the selection order accurately, all selection orders are tested and then the selection order satisfying the "condition 4", (the maximum size of the group becomes the smallest) is executed. More practically speaking, two groups having the smallest group sizes of the results of merging are selected (when there are more groups having the same size, it is possible to select any two groups among the groups arbitrarily). In this way, it is often possible to obtain a favorable result.

The processing from Step 2.3.4 to Step 2.3.6 aims at performing adjustment when the "condition 1" shown in the "requirements for division" cannot be satisfied until this processing. As a basic concept, the sub-form is divided into necessary sizes, and the reference relations are also modified so as to satisfy the condition 2 by means of virtually copying the validators. Firstly, every group is judged as to whether or not the size thereof is equal to or below the size based on the terminal capacity (Step 2.3.4). If all the groups satisfy the condition that the sizes thereof are equal to or below the size based on the terminal capacity, the subroutine for the processing of the adjustment of division is completed. When there are groups having the sizes larger than the size based on the terminal capacity, one of the groups having the excessive sizes is selected and divided again into necessary sizes (Step 2.3.5). Here, this processing can be executed by use of the conventional techniques such as one disclosed in the above-described Patent document 1. Thereafter, along with the division, the validator making reference to the original groups is copied so as not to make reference to two or more divided groups at the same time (Step 2.3.6). In other words, for example, if a validator V makes reference to an input item in a group G and if the validator V makes reference to both of groups G1 and G2 as a result of dividing the group G into the groups G1 and G2, then the validator V is copied and replaced by a validator V1 which makes reference only to the group G1 and by a validator V2 which makes reference only to the group G2. Thereafter, the processing returns to Step 2.3.4, and the subroutine is repeated. Here, the effect of the copying of the validator must be nullified in an automatic addition algorithm for the "submit" button in Step 6.6 and Step 6.7 of FIG. 7 to be described later. That is, even if the validator is copied in Step 2.3.6, the validator used in Step 6.6 and Step 6.7 must be the original validator provided before copying.

Next, generation of a page UI to be mainly executed by the screen generation unit 22 of the form division generation unit 20 will be described with reference to FIGS. 7 to 9.

Figure 7:
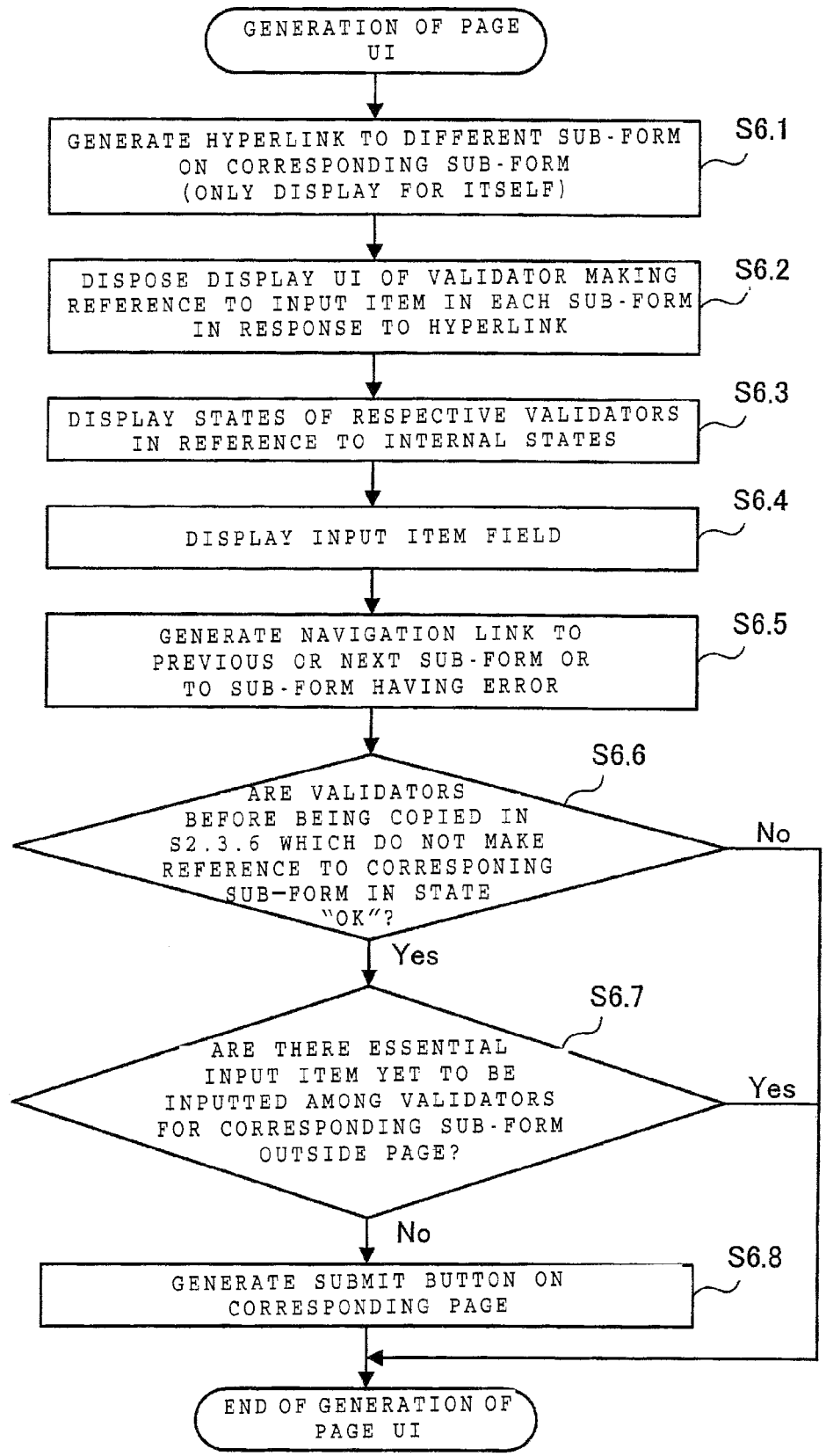
FIG. 7 is a flowchart showing processing for generating a page UI.

FIG. 7 is a flowchart showing processing for generating the page UI. Here, display user interface for the validator or the input state and a hyperlink for error correction are dynamically generated on the forms divided in Step 2 shown in FIG. 3. To achieve dynamic generation, it is necessary to incorporate a mechanism for displaying dynamic information when generating the pages in Step 2.4 shown in FIG. 4. This can be achieved by use of a dynamic page description technique such as the JSP.

FIG. 8 is a view showing an example of a JSP code to be generated herein. The example of FIG. 8 utilizes Apache Struts. This drawing shows the content of a second JSP out of pages obtained by dividing a certain form into three pieces (divpage1.jsp, divPage2.jsp, and divPage3.jsp).

Figure 9:
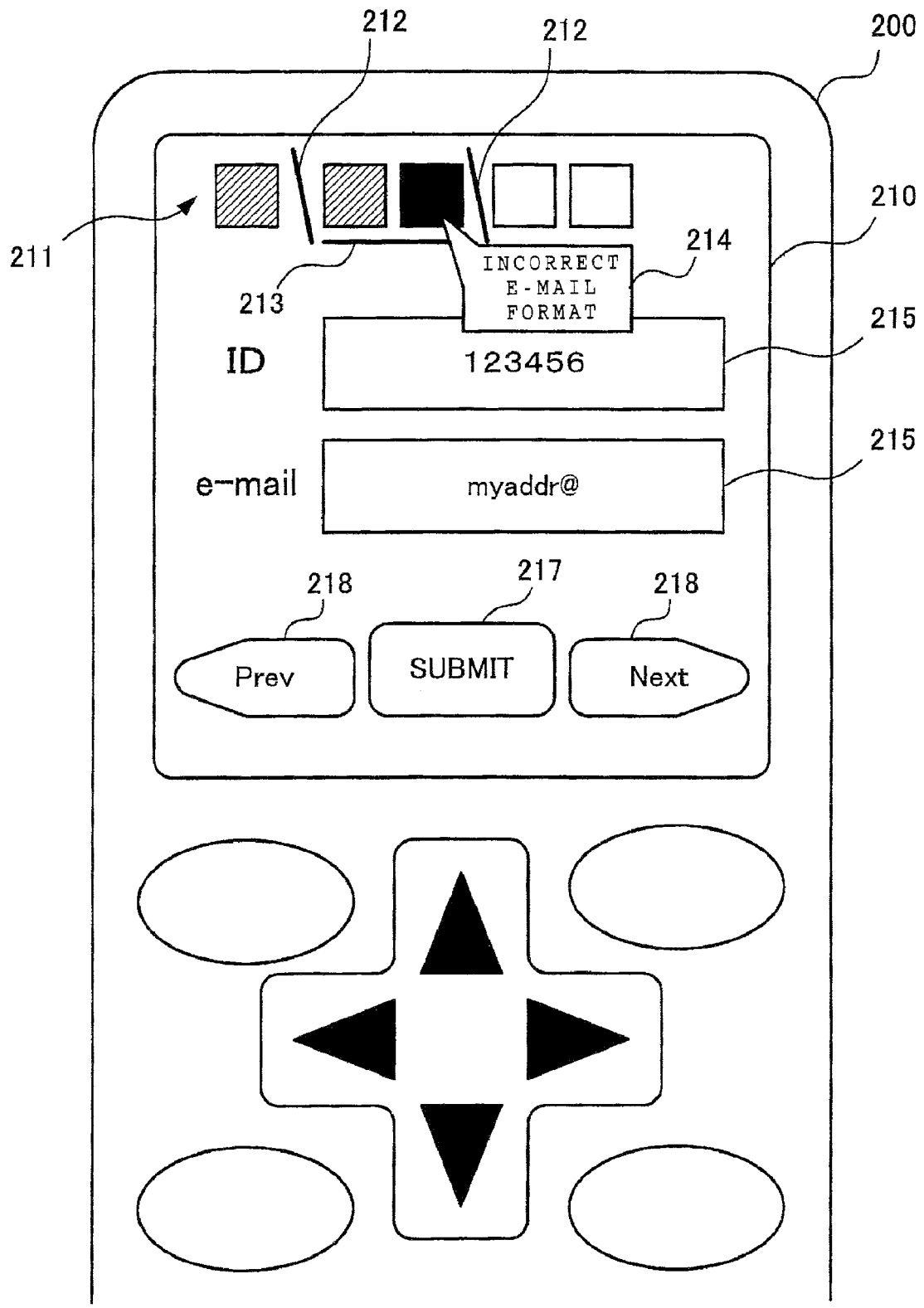
FIG. 9 is a view showing an image example of a divided form subjected to rendering by a cellular telephone.

Meanwhile, FIG. 9 shows an image example of a divided form subjected to rendering by a cellular telephone.

A bean output sentence for displaying states of execution of the validators belonging to the respective pages is located from the sixth to ninth lines in FIG. 8. As a method of outputting the states of the validators, there is a method configured to calculate states of the pages by use of the states of the validators for the respective pages, and then to display a piece of state for each page, such that a state of validation of the page is "OK" when all the validators are "OK", and such that the state of validation is "NG" in other cases, for example. When the terminal to be the target includes a high-grade UI such as capability of displaying explanation of a validator by use of a speech balloon caused by "mouse over" on status display graphics, for example, such display is conducted on a validator basis instead of a page basis. In this way, it is also possible to provide more detailed information. In such a case, a section between the pages is displayed to be more discernible by inserting a character "|" therebetween, for example. In this way, the user can easily recognize on which page an error is occurred.

In addition, if a state display part constitutes a hyperlink by itself, the user can promptly display the relevant page by a direct operation (an <a> tag). Moreover, it is possible to draw attention of the user to the current page by use of an emphasized display (an <em> tag).

These outputs are preformed by controlling the "Java Bean" designated by the "userBean" on the third and fourth lines. In Step 6.1, Step 6.2, and Step 6.3 in FIG. 7 outputs from the third to eighth lines are performed. Specifically, when generating the page UI, firstly the hyperlink to a different sub-form is generated on the corresponding sub-page (Step 6.1). The sub-form of the own page (the relevant sub-form) is displayed without the hyperlink. Meanwhile, a display UI of the validator, which makes reference to the input item in each sub-form, is disposed so as to correspond to the hyperlink (Step 6.2). Then, the state of each validator is displayed by use of the internal state (Step 6.3). Here, the states of the respective validators ("OK", "NG" or "not validated") are set on properties, named status 1, status2, and so forth, of a "divform.ValidatorStatus" class. As displayed on an HTML screen, values to be set actually are "OK" (when the validation is "OK") and "<em>ERR</em>" (when the validation is "NG"), and these codes are outputted. When possible, this portion can apply graphics (box display) or a color by use of an <img> tag and the like. In this way, it is possible to enhance visibility of the user. In addition, a special validator such as unfinished input check may be displayed in a different color. Accordingly, it is possible to enhance the usability. For instance, it is possible to display "NG" in red when the validation is "NG", and to display a small box in light red in case of the unfinished input. Here, the unfinished input merely means that the input is unfinished, which does not always mean an error.

In Step 6.4 and Step 6.5 in FIG. 7 generation from the ninth to fourteenth lines in FIG. 8 is performed. Specifically, the input item fields are displayed (Step 6.4), and navigation links to previous or next sub-forms or to a sub-form having an error are generated (Step 6.5). Here, as shown in the tenth line, an initial value of the input item is also set. When a value of a "username" item has been inputted already on a different page (including the previous input by itself), each inputted value is set to the bean of the "ValidateStatus" class, so that the value can be retrieved by a "value" method. In this case, the input items copied in the course of division of the input item group are set to the same value as an original value.

Although the above-described example shows only the links to the previous and next pages, it is also possible to generate a navigation link which allows selecting the page having an error and moving thereto.

In Step 6.6, Step 6.7, and Step 6.8 in FIG. 7 automatic addition of the "submit" button by use of the bean output sentence located on the twelfth line of FIG. 8 is achieved. Firstly, in Step 6.6, a check is made as to whether or not the validators before being copied in Step 2.3.6 shown in FIG. 6, which do not make reference to the relevant sub-form, are in the state of "validation OK". In the case other than "validation OK", the page UI generation processing is completed. In the case of "validation OK", the processing proceeds to Step 6.7. In Step 6.7, a check is made as to whether or not there are any essential input items without being inputted in other than the relevant sub-form by use of a validator which makes reference to input items in the relevant sub-forms. When the essential input item is located outside the page, the page UI generation processing is completed. When the two conditions of Step 6.6 and Step 6.7 are satisfied, the "submit" button is generated on the relevant page (Step 6.8). Specifically, generation of the "submit" button is instructed to the bean of the "Divform.SubmitMaker" class. For example, this instruction is achieved by invoking a method such as "makeSubmit( )". When instructed, the bean of the "SubmitMaker" class modifies the internal state and outputs the "submit" button. In reality, a "renderButton" property is retrieved at the time of outputting the JSP. When outputting the "submit" button by checking the internal state, a character string such as "<input type="submit" value="Login"/>" is outputted. When it is not possible to output the "submit" button, an empty character string is returned only to permit transition to other divided pages. In this way, the page UI generation processing is completed.

FIG. 9 shows an example of a screen of a cellular telephone which is generated as described above. In a user interface of the divided form associated with display of the states of the validators shown in FIG. 9, on a screen 210 of a cellular telephone 200, are generated: sub-form status display 211 for displaying a plurality of boxes provided in each validator; division display 212 for indicating sections corresponding to the validators by delimiting by use of lines "|"; current form display 213 for clarifying the positioning of a divided form with respect to the entire form by indicating the box of the validator which displays the current form on the screen 210 with under lines; speech balloon display 214 for explaining the validator by use of a speech balloon caused by the "mouse over" on the status display graphics; input items 215 for inputting respective items in the sub-form; a "submit" button 217 which is automatically added when appropriate; and pop-up buttons 218. In the sub-form status display 211, one square represents one validator. In this way, it is possible to grasp the states of the respective validators. By displaying the states of the respective validators in different colors, it is possible to recognize states as to whether or not an input is performed and whether or not a validation is preformed in each divided sub-form. Moreover, by applying a hyperlink function to the sub-form status display 211, the user can promptly display a relevant sub-form screen by designating a predetermined box.

Next, an example of dividing an HTML form input screen including numerous input fields to conform to a small-screen terminal (a cellular telephone which can access the Web) will be described.

FIG. 10 is a view showing a part of a page of a job application form in the Web site provided by the applicant. There are 29 input fields which are related to one another in this page, and several validators such as fields inevitably requiring inputs are also provided therein. It is obviously difficult to display the page at a time on a small screen of the cellular telephone. Even if the page can be displayed thereon, the usability for a user seems poor.

Assumptions will be made herein that this HTML document is given as a form input and that validator programs for the respective fields written in Java are given as the validators. It is conceivable that various validators exist in this form. For example, in FIG. 10, the fields marked with "." as "Required" are essential input fields where a user must fill in. In this case, one of the validators is configured to check whether or not such an essential field is inputted.

Validation for checking an input of a "First Name" is written in a Java program as follows:

```
boolean requiredValidator (HttpServletRequest request) {
    String fieldValue = request.getParameter ("First Name");
    If(fieldValue!=null && fieldValue. length( ) > 0) return true;
    else return false;
}
```

The input by the user can be acquired from a Java object called "request" by use of a "getParameter" method. An identification character string (which is "First name" in the above-described example) unique to the field is given as an argument. If this character string is an empty character string (null or the length equal to 0), then a judgment is made that the input is unfinished. Accordingly, this validator (a method called "requiredvalidator") returns "false" (namely, "validation NG"). In other cases, the validator returns "true" (validated). In this example, it is possible to confirm the input item to be referenced by observing an argument of the "getParameter" of "request" object. It is apparent that the input item called "First Name" is referenced by this validator (Required).

Similarly, an input item called "Last name" is given by a similar program, and it is apparent that a different "Required" validator makes reference to the input item "Last name". In reality, there are cases where the name of the input field is referenced by a different method of the Java program. Accordingly, to be more precise, it is necessary to carry out a data flow analysis of Java codes. Such essential input fields can be similarly related to respective "Required" validators. As similarly, a validator (Person Name) for validating as to whether a person name is inputted correctly are watching three input fields, namely, the field "First name", a field "Middle name", and a field called "Last name". This validator checks whether a person name is inputted properly (in other words, whether the fields "First name" and "Last name" are not empty, whether proper characters are used therein, and the like). In this case, there are three fields referenced by the "Person Name" validator, namely, the field "First name", the field "Middle name", and the field "Last name".

Figure 11:
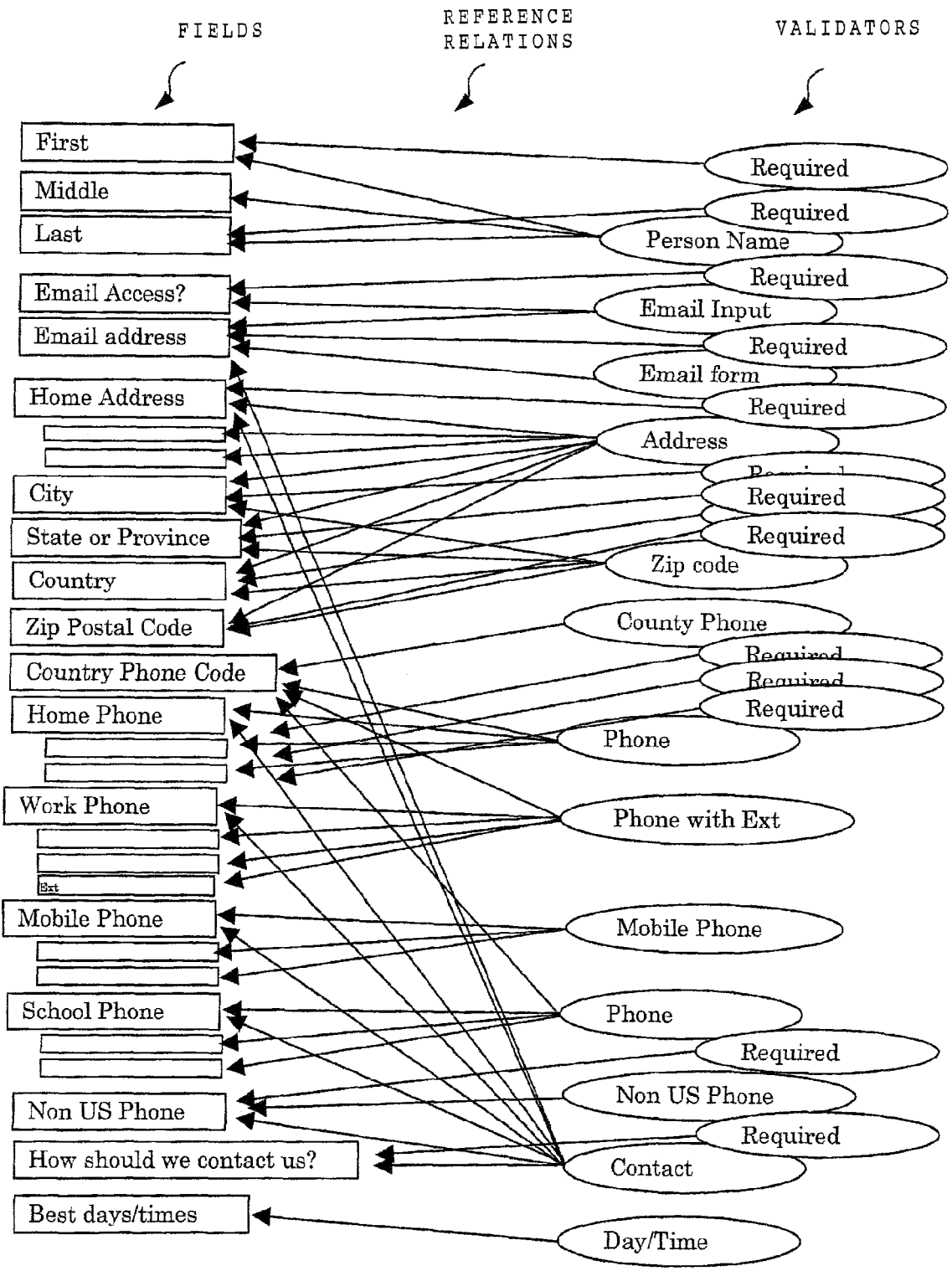
FIG. 11 is a view showing analysis results of reference relations among all validators and input fields.

FIG. 11 is a view showing analysis results of the reference relations among all the validators and the input fields obtained by the foregoing process. Rectangles represent the fields, ovals represent the validators, and arrows represent the reference relations. From the reference relations among the form validators and the input items as shown in FIG. 11, division of the input items (these input field groups) shown in Step 2.2 of FIG. 4 is carried out. Here, instead of using an accurate maximum value of the screen size, the following approximate expression is applied practically. This approximate expression is what is configured by determining a function which is considered to be easy to use for a user empirically. The following approximate expression is an example thereof. It is only necessary to determine a function conservatively, which seems applicable to all kinds of terminals. Here, an assumption is made that the number of the input fields of the form for one page is in a range defined as from "(the number of lines the screen can display)/2" to "(the number of lines the screen can display)*1.5. Here, considering a cellular telephone which can display 6 lines in one screen, for example, the desirable number of fields to be placed in one screen is in a range from 3 to 9 pieces. The reason why the number is given in the range instead of being the definite maximum size is for achieving practical application. For example, it is possible to select the largest number of 9 pieces in the course of the judgment of division according to Step 2.2.2 shown in FIG. 5, Step 2.3.4 shown in FIG. 6, or the like. Alternatively, it is possible to select the smallest number of 3 pieces in the course of the judgment of combination according to Step 2.3.1 shown in FIG. 6, or the like.

Here, a field "Country Phone Code" is shared by the respective telephone number validators for "Home Phone", "School Phone" and "Work Phone". Therefore, Step 2.2.1 shown in FIG. 5 results in 11 input item groups. Accordingly, it is possible to divide this field "Country Phone Code" into respective screens for inputting the telephone numbers each including 3 to 4 fields by means of copying the field "Country Phone Code" in triplicate. Similarly, concerning a field "How should we contact you?", it is necessary to validate as to whether or not the input field (electronic mail, address, and each telephone number) corresponding to a selected contact method is properly inputted. Without any modification, there will be formed a group including more than 10 fields. Accordingly, it is possible to establish independent groups for this validator by copying the respective input fields concerning the contact method.

Figure 12:
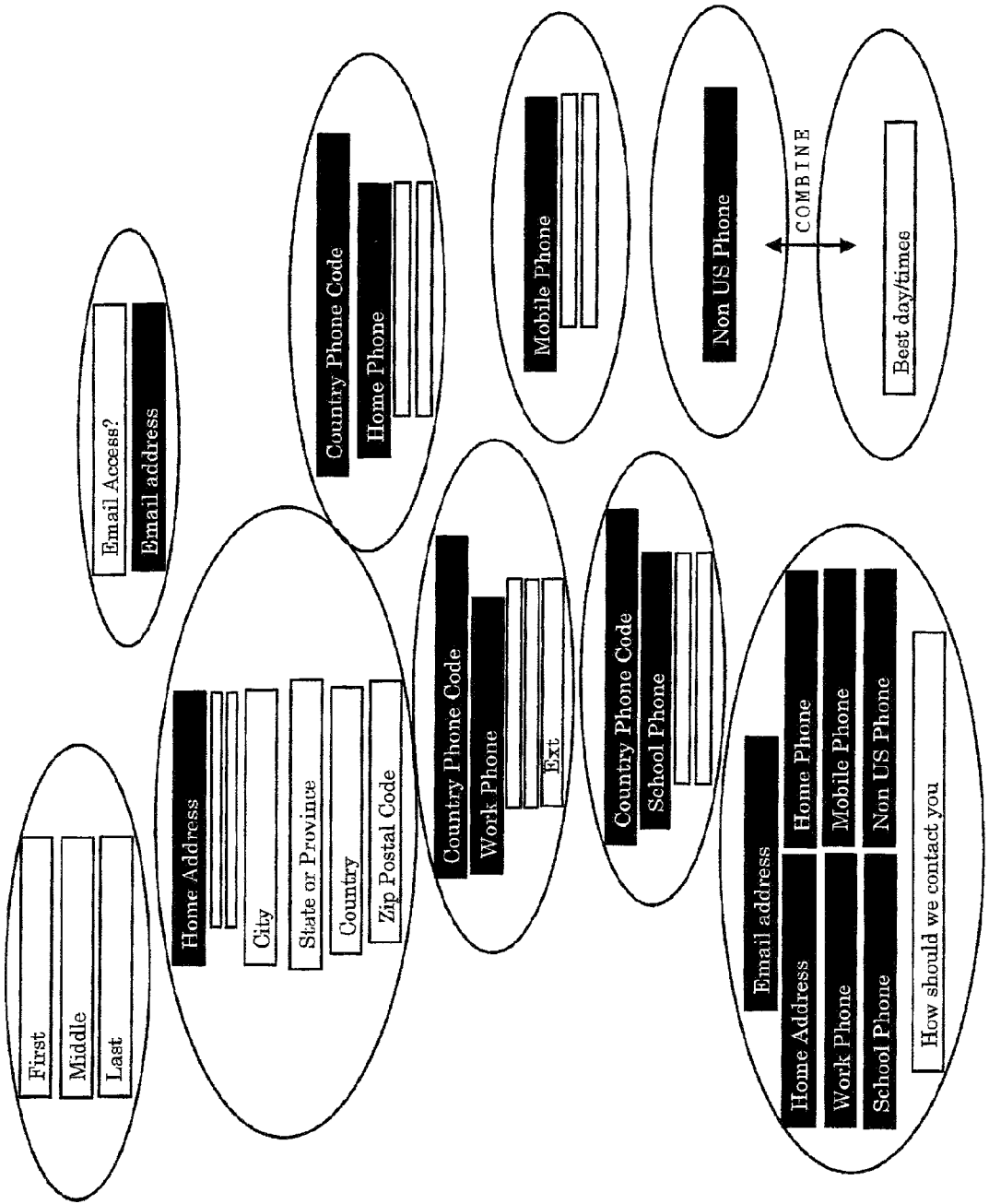
FIG. 12 is a view showing results of subjecting the reference relations among the validators and the input fields to division processing according to Step 2.2.

FIG. 12 is a view showing results of subjecting the reference relations among the validators and the input fields shown in FIG. 11 to the division processing according to Step 2.2 of FIG. 4. Highlighted fields with white letters in black backgrounds are copied fields. Next, when Step 2.3 of FIG. 4 is executed, a page including a field "Non US Phone" and a page including a field "Best days/times" are combined into one group because each of these pages includes only one field. As a result, the reference relations can be divided into 9 groups of fields. The original HTML is divided and respective divided form screens are generated so as to reflect the result of division. It is possible to generate 9 JSP files as described above for respective groups depending on the respective terminals (the client devices 50) having similar capability or depending on the usable markup languages. Upon execution, it is possible to receive the input from the user by managing the internal states of the respective fields (23 pieces) and the internal states of 27 validators with a Servlet program of a J2EE.

Figure 13:
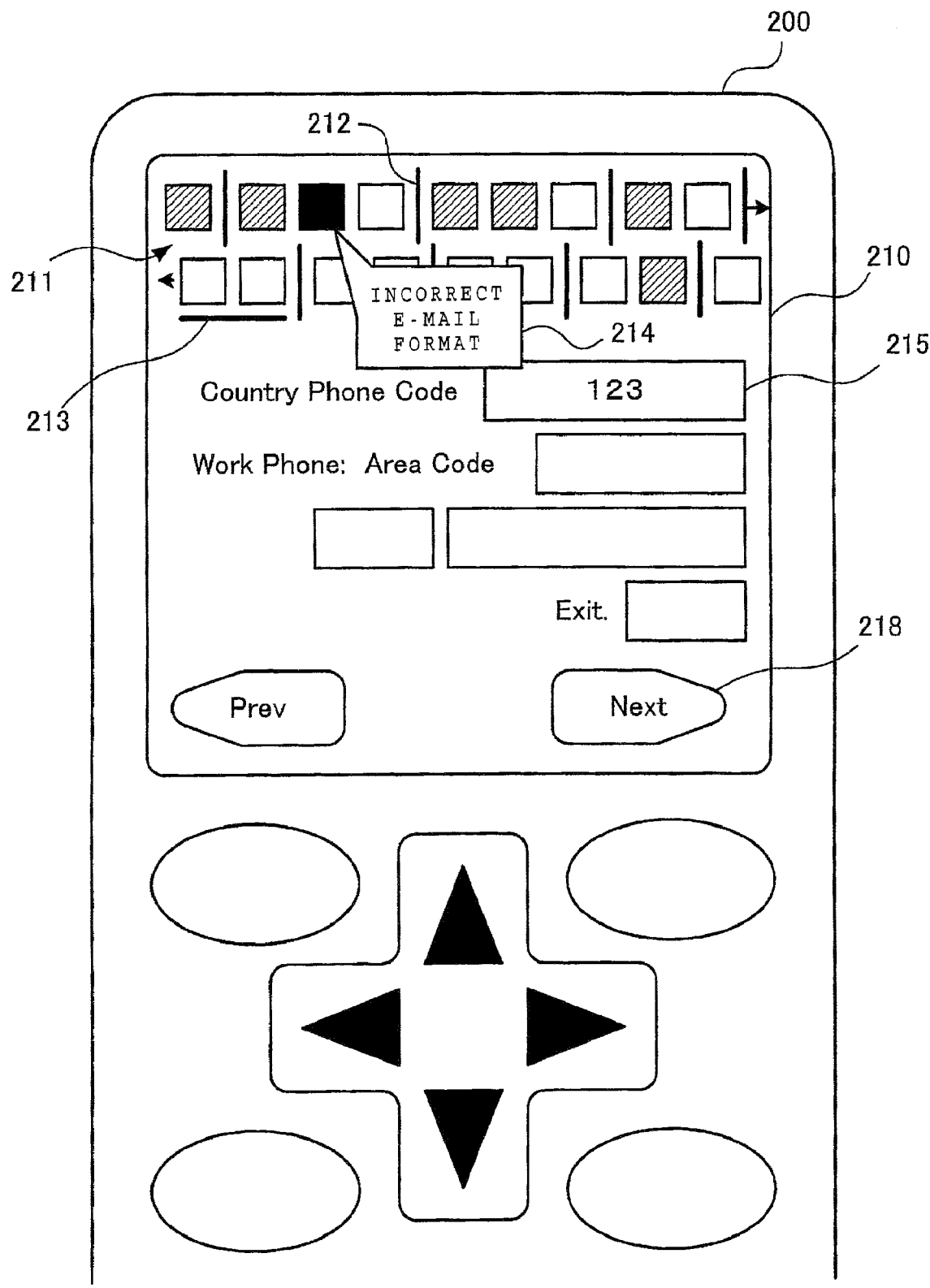
FIG. 13 is a view showing an example of an output result of a sub-form screen for "Work Phone".

FIG. 13 is a view showing an example of an output result of a sub-form screen for the "Work Phone". Similar reference numerals are designated for functions similar to those in FIG. 9, and description thereof will be omitted. In this example, states of 13 validators are displayed with boxes on an upper part of the screen. Although illustration of 14 other validators which inevitably require inputs is omitted herein, it is possible to display all the validators by use of smaller boxes. Meanwhile, vertical lines "|" (the division display 212) represent sections of the pages. Accordingly, 9 pages of sub-forms are displayed in total. However, due to the processing in Step 2.1 shown in FIG. 4, the validators for validating the inputs of selection of a contact destination and actual data for the contact destination (electronic mail, address, and each telephone number) are displayed in duplicate as a result of copying the input items. For this reason, 18 boxes are observed in total in FIG. 13. For example, while an input screen for the electronic mail is located on the second page, 3 boxes for checking the contact destination (the third to fifth boxes counting from the left on the upper part) are displayed in addition to a check of an input of an electronic mail and a check of an electronic mail address format. Here, it is apparent that one of the validators is "NG" (here, a speech balloon (the speech balloon display 214) caused by the "mouse over" explains that the electronic mail format is "NG"). Meanwhile, the screen currently in process is indicated by an underline (the current form display 213) below the corresponding box. The "Work Phone" input screen is located on the fifth page. Existence of "not validated" validators from the first to fourth pages is attributable to a fact that the contact destination is not designated yet and that these validators are not operated. Since no input is made on the sixth page and thereafter, the "submit" button is deemed not to be processable and is therefore not displayed.

Here, it is also possible to retrieve the validator codes and the reference relations easily from various definition files of the Web application program. For example, by utilizing a Validator Framework according to the Apache Struts, it is possible to find the reference relation between the validator and the field required as the input in this embodiment. By use of a definition file (validation.xml) for a validator in a Struts application program, the definition of the validator code for the electronic mail input field included in the form shown in the examples with reference to FIG. 10 and the succeeding figures is expressed as follows:

```
<form-validation>
    <formset>
    <form name="IBMJobsForm">
    ...
    <field property="EmailAddress" depends="required, email">
    <arg0 key="prompt.EmailAddress" />
    </field>
    ...
    </form>
        </formset>
        </form-validation>
```

Here, the <form-validation> tag defines all the forms which require validation. Meanwhile, the <form> tag describes all the fields and the validators in the respective forms, and the <field> tag therein defines the validators to be mapped in the field. The "property" attribute in the <field> tag specifies a property name for the corresponding field. Accordingly, specific fields are indicated in conformity to the values of the "property" attribute attached to the <text> tags (custom tags for inputting character strings in the Struts) or the like in the actual JSP files. Moreover, the validators related to the fields are enumerated by use of the "depends" attributes. In this example, the "required" validator for validating the input and the "email" validator for validating the electronic mail format are designated. Meanwhile, the <arg . . . > tag in the <field> tag designates various values used in the validator codes. Here, a GUI character string in a field for an error message is indirectly defined. By use of these scripts, it is apparent that the "email" validator makes reference to the "EmailAddress" field, and that the "required" validator also makes reference to the "EmailAddress" field. In terms of other fields and validators, it is also possible to find the reference relations similarly by use of the "validation.xml".

As described above in detail, according to this embodiment, it is possible to divide a complicated form automatically in conformity to a capacity of an arbitrary terminal, and to display error indication, navigation to an error screen, and the "submit" button appropriately and automatically. To be more precise, semantically related input items are simultaneously displayed on one page within the range not failing the "condition 1" shown in the "requirements for division". Accordingly, the user can perform input operations and correct an error reported by the validator easily. Moreover, it is possible to display a state of an error on the screen so as to allow the user to jump easily to the page having the error by a direct operation. In addition, since the "submit" button of the form automatically appears only when there is a possibility that the inputs are completed. Accordingly, it is not necessary to turn the pages over to the last page vainly for "submitting", for example. Alternatively, it is possible to avoid useless starting of the form processing and useless error processing which may be caused by providing the "submit" button on every provided page. In addition, it is not necessary to perform such effective division manually depending on the device. Since the sub-forms are generated automatically, it is possible to improve the efficiency in the development of Web application programs for multiple devices.

Meanwhile, this embodiment is also provided as a program for causing the Web server 10, which is the computer, a development machine for developing application programs or the like to execute a variety of processes. When these programs are provided to the computer, in addition to a case of being provided in a state being installed in the server, the program to be executed by the computer may be also provided by use of a computer-readable recording medium, for example. As such a recording medium, various DVDs, CD-ROM media, and the like are applied, for example. Here, the program is read by various DVDs or CD-ROM readers, stored in a flash ROM or the like, and then executed. Alternatively, it is possible to provide these programs through a network by use of a program transmission device, for example.

Here, the present invention grasped as an invention of the recording medium as described above is as follows: specifically, "a recording medium recording a program for causing a computer to divide and display a form in a style conforming to a terminal used by a user by achieving functions of: means for acquiring a terminal capacity of a terminal transmitting a form request; means for reading a screen definition of the form subjected to the form request and a code of a validator for executing validation of an input value inputted into an input item in the form out of a storage device; and means for dividing the form in conformity to the acquired terminal capacity by use of the read-out screen definition of the form and the read-out validator".

Moreover, "a recording medium recording a program for causing a computer to divide and display a form in a style conforming to a terminal used by a user by achieving functions of: means for reading a screen definition of a form and a code of a validator for executing validation of an input value inputted to an input item in the form out of a storage device and dividing the form in conformity to a terminal capacity of a terminal to output contents of the form; and means for generating a display user interface for displaying an internal state including a state of each input item of the form and a state of the validator together with a sub-form obtained by division.

Applications of the present invention may include computers as a server for mainly providing a Web form, and a program to be executed by these computers, for example. Moreover, in addition to a mode of installation in the computer, the program may adopt a mode of storage in various recording media such as a CD-ROM, a mode of transmission through a network such as an Internet, and the like.

Although the preferred embodiments of the present invention have been described in detail, it should be understood that various changes, substitutions and alternations can be made therein without departing from spirit and scope of the inventions as defined by the appended claims.

What is claimed is:

1. A display control information generation method comprising:
   using an input/output device receiving a request for a form from a terminal used by a user, said form comprising input fields to be populated with input values supplied by said user;
   using a processor device for:
   acquiring a terminal capacity of the terminal transmitting the form request;
   initializing an internal state of a web page;
   dividing the form in conformity to the acquired terminal capacity by use of a read-out screen definition of the form and read-out validators in order to generate sub-form pages, wherein the dividing step comprises steps of:
   deriving a reference relation between the validators and input items;
   grouping the input items into input item groups in the sub-form pages to categorize an input item of the input items referenced by a same validator in a same input item group such that input fields to be referenced by one validator do not belong to two or more divided forms; and
   dividing the input item groups into sizes not exceeding a predetermined size determined by the terminal capacity;
   for any groups that exceed the pre-determined size, performing:
   selecting one of the groups exceeding the pre-determined size;
   within the selected group, identifying the input items referenced by two or more validators in said selected group;
   selecting the input item referenced by the most validators from the input items referenced by two or more validators;
   copying the selected input item in duplicate; and
   modifying the reference relation to reference an original field and a copied field by different validators independently;
   using the input/output device for transmitting the sub-form pages obtained by division to the terminal;
   in response to the transmission, receiving a processing request from the terminal, said processing request comprising values of input items in the sub-form pages, and any determination of navigation processing to a different sub-form page;
   retrieving the validators corresponding to the input items;
   validating input values according to the retrieved validators and the navigation processing; and
   updating the internal state of the web page using the validated input values.

2. The display control information generation method according to claim 1, further comprising:
   a division adjustment step of adjusting the groups, in terms of the groups obtained by grouping in the dividing step, so as to allow a result obtained by merging all adjacent groups to exceed the terminal capacity.

3. The display control information generation method according to claim 1, further comprising the step of:
   generating a user interface for acquiring an input for an input item of the sub-form by a user, and for indicating the status of the validator having a reference relation with the input item to the user.

4. A computer program product embodied on a computer readable recording medium, and enabling a computer to perform steps of:
   receiving a request for a form from a terminal used by a user, said form comprising input fields to be populated with input values supplied by said user;
   acquiring a terminal capacity of the terminal transmitting the form request;
   initializing an internal state of a web page;
   dividing the form in conformity to the acquired terminal capacity by use of a read-out screen definition of the form and read-out validators in order to generate sub-form pages, wherein the dividing step comprises steps of:
   deriving a reference relation between the validators and input items;
   grouping the input items into input item groups in the sub-form pages to categorize an input item of the input items referenced by a same validator in a same input item group such that input fields to be referenced by one validator do not belong to two or more divided forms; and
   dividing the input item groups into sizes not exceeding a predetermined size determined by the terminal capacity;
   for any groups that exceed the pre-determined size, performing:
   selecting one of the groups exceeding the pre-determined size;
   within the selected group, identifying the input items referenced by two or more validators in said selected group;
   selecting the input item referenced by the most validators from the input items referenced by two or more validators;
   copying the selected input item in duplicate; and
   modifying the reference relation to reference an original field and a copied field by different validators independently;
   transmitting the sub-form pages obtained by division to the terminal;
   in response to the transmission, receiving a processing request from the terminal, said processing request comprising values of input items in the sub-form pages, and any determination of navigation processing to a different sub-form page;
   retrieving the validators corresponding to the input items;
   validating input values according to the retrieved validators and the navigation processing; and
   updating the internal state of the web page using the validated input values.

* * * * *